H. W. PROUTY & ALBERT THOMPSON.
Improvement in Clothes Line Reels.
No. 124,698.  Patented March 19, 1872.
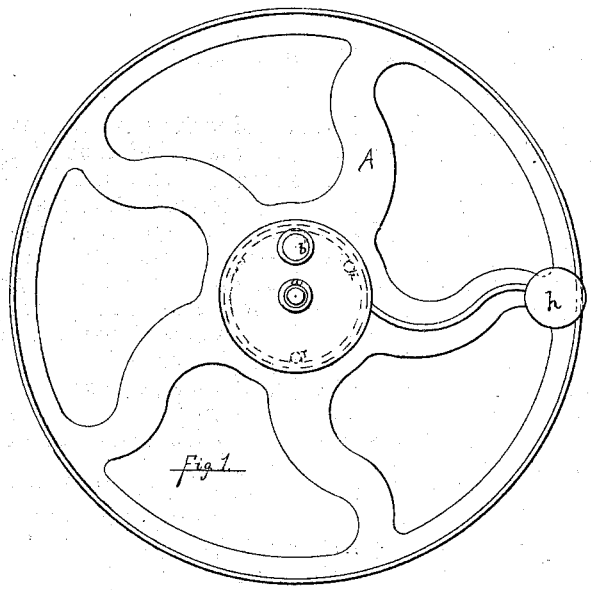
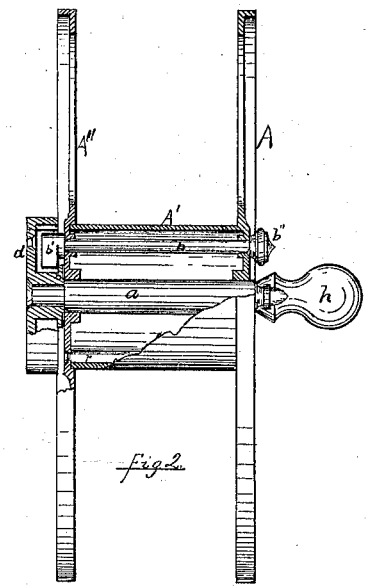
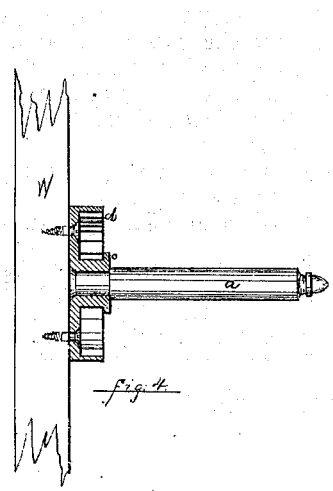
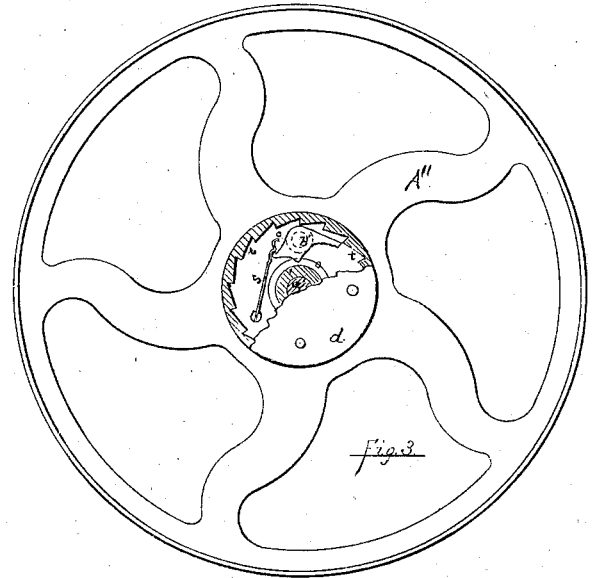

No. 124,698

UNITED STATES PATENT OFFICE.

HENRY W. PROUTY AND ALBERT THOMPSON, OF BOSTON, MASSACHUSETTS.

IMPROVEMENT IN CLOTHES-LINE REELS.

Specification forming part of Letters Patent No. 124,698, dated March 19, 1872.

We, HENRY W. PROUTY and ALBERT THOMPSON, both of Boston, county of Suffolk and State of Massachusetts, have invented an Improved Clothes-Line Reel, of which the following is a specification:

It is always desirable to suspend a clothes-line at a considerable distance from the ground in order to prevent the clothes from trailing in the dirt, and when a reel is used for tightening the line, which can only receive the line from a horizontal direction, much inconvenience is felt from operating it at so great height.

The object of our invention is to furnish a reel which may receive the line from a perpendicular as well as a horizontal direction.

The line passes over hooks or pulleys from post to post, in the usual manner, to a pulley directly over the reel, thence downward to the reel, which is suspended at any distance from the ground most convenient for the operator.

Figure 1 is a front elevation of the reel. Fig. 2 is a side section, showing inside of hub, stud, rod, pawl, &c. Fig. 3 is a rear section, showing ratchet, pawl, and spring. Fig. 4 is a side section, showing stud and base, with method of fastening same to the post or wall of building.

The flanges A and A'' and hub A' are made of metal, the flange A and hub A' being cast of one piece. The end of the hub A' terminates in three pins or studs, which pass through the flange A'' and are riveted down. A hole through the center of the hub A' receives the stud $a$, on which the reel revolves. One arm of the flange A is strengthened by a rib, which serves as a crank, to which the handle $h$ is attached. The rod $b$ passes entirely through the hub A'. On one end is fastened the pawl $b'$ and on the other end the milled knob $b''$, by which the pawl $b'$ is turned. The base $d$ is secured to the post W by screws, and forms the support for the stud $a$. The inner surface of the flange on the base $d$ contains teeth, into which the pawl $b'$ is thrown by the spring $s$, thus preventing reaction. The collar $o$, being larger than the hub of the base $d$, forms a recess, into which the back part of the pawl drops, as shown in Fig. 3, thus preventing the reel from slipping off the stud $a$. The spring $s$ is crooked at the end in such a manner as to form two distinct stops.

By means of the knob $b''$ the pawl is turned down until the back end drops into the first notch in the spring $s$, when the reel will revolve freely in either direction. By turning the knob further forward the pawl is moved into the second notch in the spring, which also raises the rear end of the pawl high enough to allow it to pass over the collar $o$, thus allowing the reel to be removed from the stud $a$. The stud $a$ may be allowed to turn in the base $d$ or may be riveted down, as occasion requires.

We claim as our invention—

1. The reel A A' A'' supported by a stud, substantially as and for the purpose forth.

2. The rod $b$ and pawl $b'$ and spring $s$, substantially as described.

3. The stud $a$ and base $d$, substantially as and for the purpose hereinbefore set forth.

H. W. PROUTY.
ALBERT THOMPSON.

Witnesses:
SAML. BATCHELDER, Jr.,
C. W. FOLSOM.